(12) United States Patent
Bohlender

(10) Patent No.: US 6,720,536 B2
(45) Date of Patent: Apr. 13, 2004

(54) ELECTRIC HEATING DEVICE

(75) Inventor: Franz Bohlender, Kandel (DE)

(73) Assignee: Catem GmbH & Co., KG, Herxheim Bei Landau (DE)

( * ) Notice: Subject to any disclaimer, the term of this patent is extended or adjusted under 35 U.S.C. 154(b) by 0 days.

(21) Appl. No.: 10/308,220

(22) Filed: Dec. 2, 2002

(65) Prior Publication Data

US 2003/0132222 A1 Jul. 17, 2003

(30) Foreign Application Priority Data

Dec. 6, 2001 (EP) .......................................... 001129025

(51) Int. Cl.[7] .................................................. H05B 1/02
(52) U.S. Cl. ........................................ 219/504; 219/540
(58) Field of Search ............................... 219/504, 505, 219/540, 530, 553; 338/22 R, 23

(56) References Cited

U.S. PATENT DOCUMENTS

| 4,045,763 | A | * | 8/1977 | Miyamoto et al. ............. 338/23 |
| 4,482,801 | A | * | 11/1984 | Habata et al. ............... 219/540 |
| 4,948,953 | A | | 8/1990 | Starck |
| 5,192,853 | A | * | 3/1993 | Yeh ........................... 219/540 |
| 5,210,516 | A | * | 5/1993 | Shikama et al. .......... 338/22 R |
| 5,658,479 | A | * | 8/1997 | Tadokoro .................... 219/505 |
| 5,831,251 | A | * | 11/1998 | Oya et al. ................... 219/504 |
| 5,889,260 | A | * | 3/1999 | Golan et al. ................. 219/505 |
| 6,114,942 | A | * | 9/2000 | Kitamoto et al. ......... 338/22 R |
| 6,300,859 | B1 | * | 10/2001 | Myong et al. ............... 337/182 |

FOREIGN PATENT DOCUMENTS

| DE | 30 42 420 A | 6/1982 | |
| EP | 0 516 112 A | 12/1992 | |
| JP | 363161471 | * 7/1988 | .......... G03G/15/20 |
| JP | 405021134 | * 1/1993 | ............ H05B/3/14 |
| JP | 406042813 | * 2/1994 | ............ F24H/3/04 |
| WO | WO 99 18756 A | 4/1999 | |

* cited by examiner

Primary Examiner—Ehud Gartenberg
Assistant Examiner—L Fastovsky
(74) Attorney, Agent, or Firm—Boyle Fredrickson Newholm Stein & Gratz S.C.

(57) ABSTRACT

An electric heating device including PTC heating elements which have electrode sheets arranged on both sides thereof. These electrode sheets supply power to the PTC heating elements and each having connected thereto radiator elements for emitting the heat generated by the PTC heating elements. An electrically insulating layer is arranged between at least one of the electrode sheets and the respective radiator element.

12 Claims, 4 Drawing Sheets

ELECTRIC HEATING DEVICE

BACKGROUND OF THE INVENTION

1. Field of the Invention

The present invention relates to an electric heating device according to the generic clause of claim 1.

2. Description of the Related Art

In motor vehicles, and in particular in motor vehicles with consumption-optimized internal combustion engines, heating devices for heating the vehicle interior and the engine are used to an increasing extent. Such heating devices are, however, also suitable for other cases of use, e.g. for room air conditioning, industrial plants and the like.

FIG. 5 shows an example where an electric heating device is used in a motor vehicle for heating the vehicle interior. Fresh air 10 taken in is heated by a blower 11 via a heating device 12 and supplied to the interior 13 of a motor vehicle. The heated air 15 flows into the vehicle interior 13 via air outlets 14a, 14b. The air to be supplied to the vehicle interior 13 can additionally be conducted over an evaporator 16a of an air-conditioning system. An electric heating device consisting of PTC heating elements preferably represents an auxiliary heating, a car heating 16b, which has its heating power supplied thereto by the vehicle engine, being normally used.

Known electric heating devices consist of a layered structure of PTC heating elements and radiator elements held in a plastic frame. The radiator elements and the PTC heating elements have provided between them electrode sheets through which the PTC heating elements are supplied with power.

These heating devices are disadvantageous insofar as, in unfavourable installation situations, metal parts, such as paper clips, coins, etc., falling through an outlet 14a into the heating/air conditioning system can come to rest on the heating element. Since the respective radiator elements are connected to ground potential and to a plus potential without being protected, the danger exists that metal parts falling into the system may cause short circuits.

DE-A1-44 36 791 discloses a heater for a heating system of a motor vehicle. The heater has a layered structure comprising corrugated ribs or corrugated fins and PTC heating tubes which are located therebetween and in which PTC heating elements are provided. The PTC heating tubes arranged in the heater consist of a thin-walled aluminium cover tube which is closed at one end thereof. This cover tube has inserted therein an insertion frame consisting of plastic material and provided with a plurality of PTC heating elements. The PTC heating elements arranged in the cover tube contact, on one side thereof, the inner wall of said cover tube and, on the other side thereof, a positive conductor arranged in said cover tube. Since the cover tube is connected to ground via the heater, the positive conductor is extended to the outside of the heating block via a special connection. An insulation is provided between the positive conductor and the inner wall of the aluminium cover tube.

This structural design is disadvantageous insofar as damage caused to the insulation between the positive conductor and the cover tube may lead to an internal short circuit. A resultant arc can normally not prevented by an ampere fuse.

It is the object of the present invention to provide a safe and reliable structural design of an electric heating device in the case of which not even a damaged insulation will cause an internal short circuit.

OBJECTS AND SUMMARY OF THE INVENTION

This object is achieved by the feature of claim 1.

According to the present invention, power is supplied to the PTC heating elements via respective electrode sheets arranged on both sides of the PTC elements. These electrode sheets each have connected thereto radiator elements for emitting the heat generated by the PTC heating elements. An electrically insulating layer is arranged between at least one of the electrode sheets and the respective radiator element.

In this way, a heating block can be prevented from comprising neighbouring radiator elements with different potentials between which a short circuit may occur. Due to the use of at least one insulating layer, the radiator elements are either potential-free or they have only one potential connected to them. A short circuit between radiator elements is therefore not possible.

Another advantage of this arrangement is that, if the insulating layer itself is damaged, this cannot yet lead to a short circuit, but that, in contrast to conventional heating devices, no short circuit will be caused and heating of the interior space will still be guaranteed.

The arrangement according to the present invention is also advantageous insofar as it has a particularly simple structural design.

According to an advantageous embodiment of the present invention, an additional insulating plate is inserted between adjoining radiator elements in a layered structure of an electric heating device comprising radiator elements and PTC heating elements. Such an insulating plate is especially inserted between adjoining radiator elements which are so configured that at least one of the radiator elements is kept potential-free by means of the electrically insulating layer according to the present invention.

One advantage of this embodiment is that the electrically insulating layer can be kept very thin so as to obtain a particularly good heat transfer, without there being any risk of short circuits, if damage is caused to the insulating layer, since a short circuit between neighbouring radiator elements is effectively prevented by the insulating plate. In this way, the operational safety and reliability of the electric heating devices according to the present invention can be increased still further.

According to another advantageous embodiment of the electric heating device according to the present invention, a single heating circuit consists of an arrangement of three radiator elements, a respective layer with PTC heating elements being arranged between these radiator elements. Due to the fact that the plus supply of the PTC heating elements is provided with an insulating layer in accordance with the present invention, the heating circuit can be subdivided into two separately controllable heating subcircuits.

An electric heating device can be formed of a plurality of such heating circuits, and the operation of said heating circuits can be finely subdivided in an arbitrary manner. In such a heating device, it can separately be decided for each heating circuit whether both heating subcircuits are to be controlled in common or separately.

One advantage of this embodiment is that an arbitrarily fine subdivision of the heating power of the individually controllable heating circuits can easily be adjusted. Even electric heating devices with high heating power can, in this way, be activated and deactivated without any noticeable load on the electric power supply of an automotive circuit.

Further advantageous embodiments represent the subject matters of subclaims.

In the following, preferred embodiments of the present invention will be explained in detail making reference to the figures, in which

DETAILED DESCRIPTION OF THE PREFERRED EMBODIMENT

Figure 1:
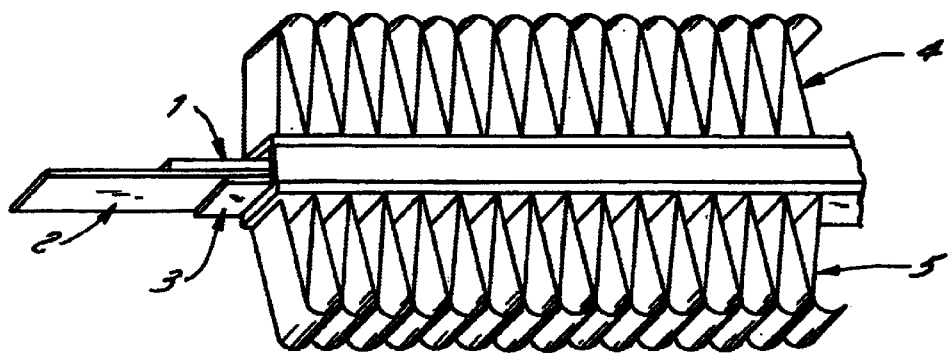
FIG. 1 shows a perspective view of a radiator unit used in the heating device according to the present invention.
Figure 2:
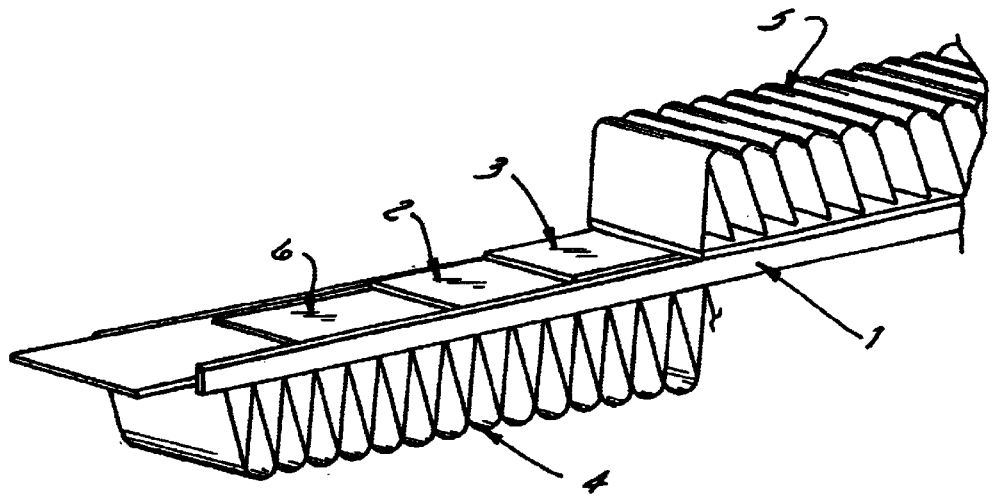
FIG. 2 shows a perspective view of the structural design of a radiator unit according to FIG. 1.
Figure 3:
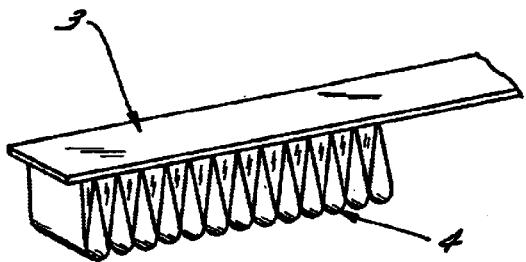
FIG. 3 shows another view illustrating the structural design according to the present invention.
Figure 4:
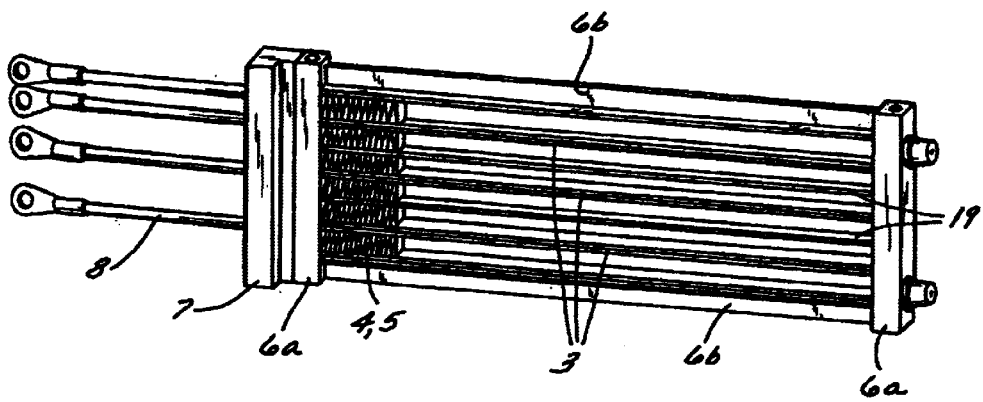
FIG. 4 shows a total view of an electric heating device according to the present invention.
Figure 5:
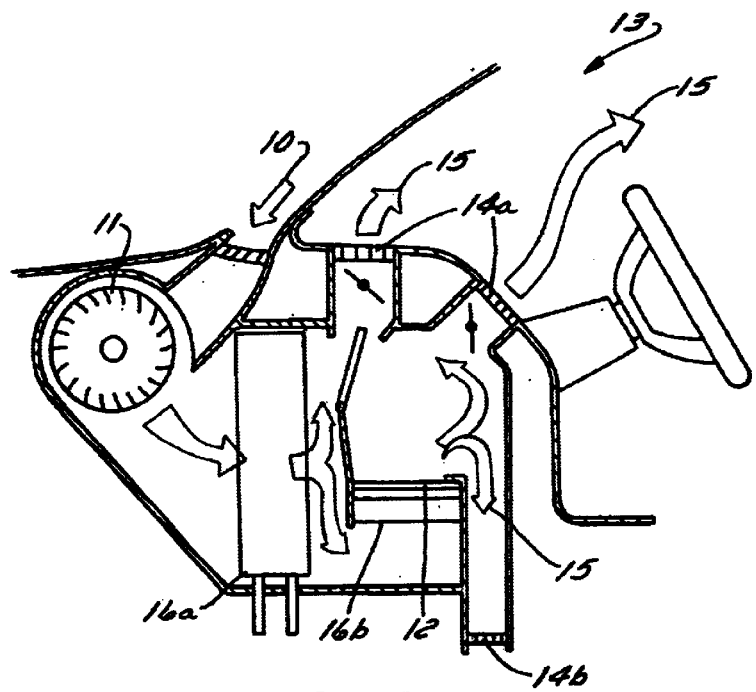
FIG. 5 shows a sectional view of an automotive air-conditioning system provided with a heating device according to the present invention.

Making reference to FIGS. 1 to 4, the structural design of a heating device according to the present invention will be described in the following. FIG. 4 shows one example for an embodiment of the heating device according to the present invention. The device consists of a layered structure or a stack of prefabricated radiator units between which PTC heating elements are provided for generating heat. Fragmentary views of a radiator unit are shown in FIGS. 1 to 3. The essential elements of such a unit are the heat-generating PTC heating elements 6 and the heat-emitting radiator elements 4, 5.

The PTC heating elements 6, which can be implemented both as disk-shaped elements and as elements having the shape of a rectangular parallelepiped, are arranged in a positioning frame 1 so as to fix their positions. The design of such a positioning frame 1 is shown in FIG. 2. The positioning frame 1 is provided with a plurality of openings for accommodating the PTC heating elements 6. The openings for accommodating the PTC heating elements 6 are preferably implemented as through holes, they may, however, also be implemented in the form of recesses. The positioning frame 1 preferably consists of plastic material, e.g. polyamide. For achieving a higher mechanical stability, it may be reinforced with the aid of glass fibres.

The PTC heating elements 6 arranged in the openings of a positioning frame 1 are preferably operated with a voltage of 12 volts to 500 volts. Depending on the voltage in question, the PTC heating elements 6 normally have a thickness between 2.1 and 1.1 mm. In FIG. 2, it can be seen that the positioning frame 1 has curvatures on the lateral edges thereof, said curvatures permitting the air to flow around said positioning frame without causing any noise.

For fastening and contacting the PTC heating elements 6, contact sheets 2 are arranged on both sides of the PTC heating elements 6. The contact sheets serve to supply current to the PTC heating elements. In the figures, only the respective plus-potential electrode 2 can be seen. The ground potential electrode is arranged in a corresponding manner on the opposite side of the positioning frame.

In a special embodiment of the present invention, self-adherent, electrically conductive foils or films are used as electrodes.

The sides of the electrode sheets 2 located opposite the PTC heating elements 6 have secured thereto respective radiator elements 4, 5 for emitting the heat generated by said PTC heating elements 6. These radiator elements are preferably implemented as corrugated rib elements. The person skilled in the art will, however, also know other conventional embodiments for transferring the heat to a medium flowing through, in particular to the air flowing through.

According to the present invention, an insulating layer 3 is applied at least between the plus-potential electrode sheet 2 and the respective radiator element 5. This insulating layer 3 electrically insulates the contact sheet 2 and the radiator element 5 from one another. This prevents the radiator element 5 from assuming a plus potential. Due to the insulation, the adjoining radiator element 5 is potential-free.

According to a first embodiment of the present invention, an insulation of the opposed radiator element 4, which is connected to ground potential, is not necessary. The insulation 3 already suffices to prevent a short circuit between the two radiator elements.

According to a second embodiment of the present invention, an insulation is provided also between the ground-potential electrode sheet and the respective radiator element 4. This embodiment has the advantage that, even if one of the two insulations is damaged, parts falling onto the radiator elements cannot cause any short circuit.

FIG. 4 shows the structural design of an interior-space heating device according to the present invention. The device consists of a layered structure or a stack of prefabricated radiator groups of the type described hereinbefore with reference to FIGS. 1 to 3. The interior-space heating device of FIG. 4 comprises a total of three heating stages. In principle, an arbitrary number of heating stages can be used. The embodiment shown may comprise PTC heating elements having a total power of up to 2,400 watt. In such a layered heating device, the PTC heating elements are held in a "clamping pack" with the other elements of the heating device. The effect produced by the clamping is of such a nature that it holds all the elements together and acts vertically onto the contact surfaces of the PTC heating elements.

The radiator groups are held in a frame comprising lateral bars 6a and longitudinal bars 6b. The electric connections 8 project laterally beyond one of the lateral bars 6a for contacting the contact sheets. One of the lateral bars 6a, 7 may by designed such that it is able to accommodate an electronic control circuit for controlling the heating stages.

Figure 6:
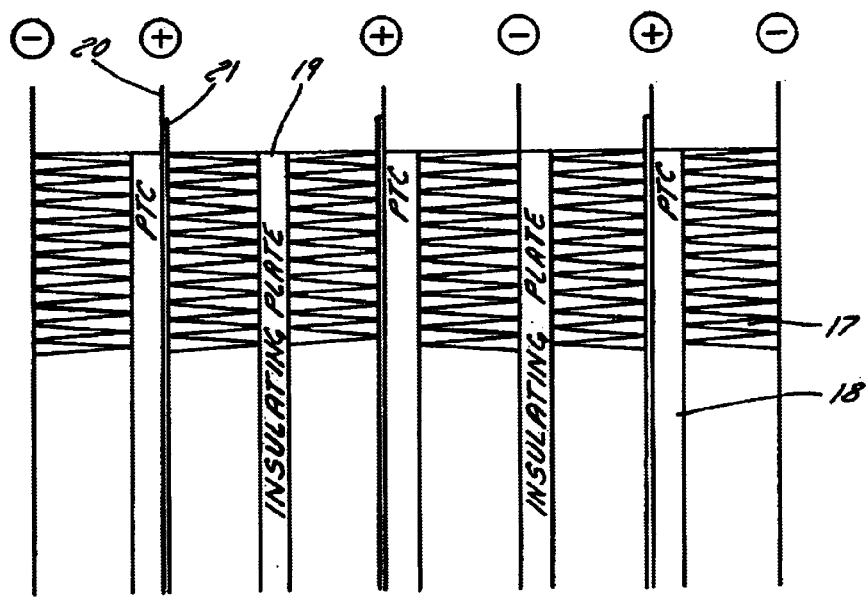
FIG. 6 shows the basic principle of an electric heating device according to another embodiment of the present invention, in which insulating plates are used between adjoining radiator elements for increasing the reliability and safety still further.

FIG. 6 shows a schematic diagram of a special embodiment of the heating device according to the present invention. The heating device consists of a layered structure or a stack of radiator elements 17 with PTC heating elements 18. In the case of the electrode sheet of the PTC heating element 18, which is connected to a plus potential 20, the insulating layer 21 according to the present invention is emphasized in the representation. Due to this insulation, the neighbouring radiator element is potential-free, if it is not in electric contact with some other, non-insulated electrode sheet. Due to the use of the insulating layer 21 according to the present invention, all the radiator elements of the heating device are either connected to ground potential or they are potential-free.

In order to increase the operational safety and reliability still further, an additional insulating plate 19 is used between adjoining radiator elements. This insulating plate 19 serves to electrically insulate adjoining radiator elements 17. In this way, radiator elements will be electrically separated from one another, even if damage should be caused to an electric insulating layer 21. The insulating plate 21 is preferably implemented as an injection-moulded plastic component. Alternatively, a component, produced from insulating material by stamping or punching can be used.

The advantage of this embodiment is to be seen in the fact that, even if the insulating layer 21 should be damaged, no direct short circuit will occur between a plus-potential connection and the ground potential. This means that also insulating layers 21 which are very thin can be used, so that these insulating layers guarantee a very good heat transfer between the PTC heating element 18 and the radiator element 17.

Figure 7:
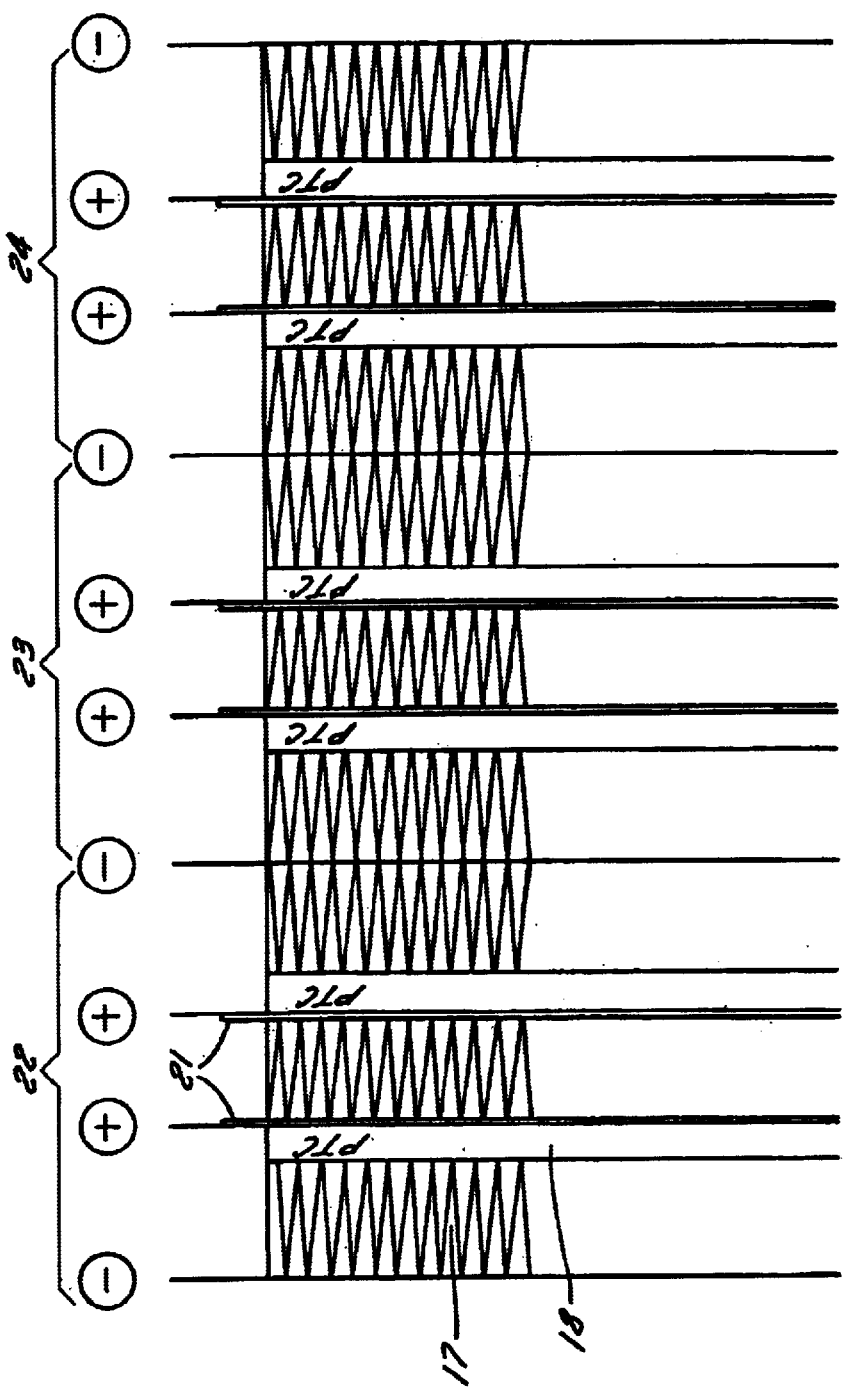
FIG. 7 shows a view for elucidating the basic principle of an electric heating device according to a further embodiment of the present invention, in which the number and the heating power of the individual heating circuits can be varied.

FIG. 7 shows another advantageous embodiment of the heating device according to the present invention. This embodiment consists of a layered set-up of radiator elements 17 and PTC heating elements 18. In FIG. 7, a total of three heating circuits 22, 23, 24 is shown; each of said heating circuits can be subdivided into two heating subcircuits. Each heating circuit 22, 23, 24 consists of three radiator elements 17 and of PTC heating elements 18 arranged therebetween. The plus-potential supply to the PTC heating elements 18 is arranged in opposed relationship with the respective middle radiator element. Due to the fact that both plus-potential supplies located in opposed relationship with the middle radiator element have an insulating layer 21, the two layers of the PTC heating elements 18 are electrically insulated from one another and can be controlled separately. It follows that each of the heating circuits 22, 23, 24 consists of a "double stage" of heating subcircuits.

Whereas, in conventional structural designs, the two PTC rows of a correspondingly implemented heating circuit consisting of opposed PTC rows 18 could only be controlled in common and represented therefore a single heating stage, such a heating stage can, if necessary, be subdivided into two separately controllable heating stages in accordance with the present invention.

In the schematic diagram of FIG. 7, three "double stages" 22, 23, 24 are shown, which can be subdivided into as many as six separate heating circuits. The number of "double stages" used can, in principle, be chosen at will and is especially determined by the heating power per double stage and by the desired maximum heating power.

The advantage of such an embodiment is to be seen in the fact that, in a fabricated electric heating device, the number of heating stages as well as the heating power of the individual heating stages are variable. In this way, electric heating devices can be adapted to the loadability of an automotive circuit.

In addition, the heating power of the activatable and deactivatable heating stages can be adjusted in an arbitrary manner in this way. On the basis of the subdivision possibility, the respective heating power required can be tuned more finely.

For a simple production of such interior-space heating devices, radiator units of the type shown especially in FIGS. 1 and 2 are prefabricated. In order to simplify an industrialized production of radiator units, "heating strips" are prefabricated. Such a PTC heating strip according to the present invention consists of a positioning frame 1 with openings for PTC heating elements. The openings are preferably punched out of the frame, the positioning frame 1 being preferably a double-C-profile made of plastic material. This positioning frame 1 has inserted therein PTC heating elements 6 in the openings thereof. For mechanically fixing and contacting the PTC heating elements 6 in the positioning frame 1, electrode sheets are fixed to the upper and lower surfaces of the positioning frame 1 together with the PTC heating elements 6. These electrode sheets are preferably glued on.

According to the present invention, an insulating layer 3 is applied to at least one side, preferably the plus-potential electrode.

The PTC heating strip produced in this way permits a particularly simple, industrialized production of a PTC heating device according to the present invention.

Summarizing, it can be stated that the present invention avoids short circuits, which may be caused by metal components falling onto radiator elements of a heating device, in that all the radiator elements are either potential-free or are connected to ground potential. In order to achieve this, an insulating layer is inserted at least between a plus-potential contact sheet used for supplying power to a PTC heating element and a radiator element arranged adjacent thereto.

I claim:

1. An electric heating device having a layered structure of a plurality of PTC heating elements and radiator elements, each PTC heating element being contacted by two electrode sheets so as to supply power thereto, and of said electrode sheets being connected to a radiator element in a heat-conducting manner, wherein an electric insulation is provided between one of said electrode sheets and the radiator element connected thereto, and wherein an insulating plate for electrically insulating the radiator elements is arranged between neighboring radiator elements.

2. An electric heating device according to claim 1, wherein the insulation is provided between a plus electrode sheet and the radiator element arranged adjacent thereto.

3. An electric heating device according to claim 1, wherein the radiator elements are implemented as corrugated ribs.

4. An electric heating device according to claim 1, wherein each of the two electrode sheets is electrically insulated from the respective radiator element arranged adjacent thereto.

5. An electric heating device according to claim 1, wherein said insulating plate is arranged between adjoining radiator elements, at least one of said neighboring radiator elements being disconnected from ground potential.

6. An electric heating device according to claim 1, wherein in said layered structure, three successive radiator elements have arranged between them a respective PTC heating element, and wherein the respective plus electrode sheet with the electric insulation is arranged adjacent a middle radiator element of the three neighboring radiator elements.

7. An electric heating device comprising:

a layered structure of a plurality of PTC heating elements, radiator elements, and electrode sheets, each PTC heating element being contacted by two electrode sheets so as to supply power thereto, and each of said electrode sheets being connected to a radiator element in a heat-conducting manner, an electric insulation between one of said electrode sheets and the radiator element connected thereto, and an insulating plate electrically insulating the radiator elements from one another, said insulating plate being arranged between neighboring radiator elements.

8. An electric heating device according to claim 7, wherein the insulation is provided between a plus electrode sheet and the radiator element arranged adjacent thereto.

9. An electric heating device according to claim 7, wherein the radiator elements comprise corrugated ribs.

10. An electric heating device according to claim 7, wherein each of the two electrode sheets associated with each PTC heating element is electrically insulated from the respective radiator element arranged adjacent thereto.

11. An electric heating device according to claim 7, wherein said insulating plate is arranged between adjoining radiator elements, and wherein at least one of said neighboring radiator elements is disconnected from ground potential.

12. An electric heating device according to claim 7, wherein in said layered structure, three successive radiator elements have arranged between them a respective PTC heating element, and wherein a respective plus electrode sheet with the electric insulation is arranged adjacent a middle radiator element of the three neighboring radiator elements.

* * * * *